(12) United States Patent
Inukai

(10) Patent No.: US 7,295,789 B2
(45) Date of Patent: Nov. 13, 2007

(54) HEATING UNIT AND IMAGE FORMATION APPARATUS

(75) Inventor: Katsumi Inukai, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 227 days.

(21) Appl. No.: 10/809,407

(22) Filed: Mar. 26, 2004

(65) Prior Publication Data

US 2004/0190923 A1 Sep. 30, 2004

(30) Foreign Application Priority Data

Mar. 28, 2003 (JP) ............... 2003-092244

(51) Int. Cl.
*G03G 15/20* (2006.01)
(52) U.S. Cl. .......................... 399/67; 399/69
(58) Field of Classification Search ................. 399/67, 399/69, 320, 328, 335, 332; 219/216; 347/156
See application file for complete search history.

(56) References Cited

U.S. PATENT DOCUMENTS

| 5,669,038 | A | * | 9/1997 | Kishimoto | .................... 399/67 |
| 6,018,140 | A | | 1/2000 | Hirose et al. | |
| 6,097,006 | A | | 8/2000 | Inukai | |
| 6,111,230 | A | * | 8/2000 | Cao et al. | .................... 219/216 |
| 6,157,010 | A | * | 12/2000 | Mine | ......................... 219/216 |
| 6,160,975 | A | | 12/2000 | Bartley et al. | |
| 6,259,073 | B1 | | 7/2001 | Inukai | |

| 2003/0072581 | A1 | * | 4/2003 | Nishida | ........................ 399/67 |

FOREIGN PATENT DOCUMENTS

| EP | 1 016 941 A1 | 7/2000 |
| EP | 1 209 541 A2 | 5/2002 |
| JP | U-61-149293 | 9/1986 |
| JP | A-1-158514 | 6/1989 |
| JP | A-6-314130 | 11/1994 |
| JP | A 11-41797 | 2/1999 |
| JP | A-11-52782 | 2/1999 |
| JP | A 11-95606 | 4/1999 |
| JP | A 11-167329 | 6/1999 |
| JP | A-2001-242740 | 9/2001 |
| JP | A 2002-6655 | 1/2002 |
| JP | A-2002-15835 | 1/2002 |
| JP | A-2002-84736 | 3/2002 |

* cited by examiner

*Primary Examiner*—David M. Gray
*Assistant Examiner*—Laura K Roth
(74) *Attorney, Agent, or Firm*—Oliff & Berridge, PLC

(57) ABSTRACT

A heating apparatus includes a heat unit that generates heat in response to energization; and an energization unit that supplies AC power to the heat unit and energizes the heat unit discontinuously in a pulsatile manner at least when energization of the heat unit is started. The energization unit turns on and off a control signal twice or more and sets an on and off period defined by sum of an on time and an off time of the control signal to a period not matching an integral multiple of a half the period of the AC power. The energization unit is configured to energize the heat unit when a control signal is on and when a voltage value of an AC power crosses zero and to stop energizing the heat unit when the control signal is off and when the voltage value of the AC power crosses zero.

22 Claims, 12 Drawing Sheets

HEATING UNIT AND IMAGE FORMATION APPARATUS

BACKGROUND OF THE INVENTION

1. Field of the Invention

The present invention relates to a heating unit and an image formation apparatus including the heating unit and in particular to a heating unit capable of reducing flicker and an image formation apparatus including the heating unit.

2. Background Art

Hitherto, a toner image fuser including heat generation means for generating heat in response to energization, a heating roller being heated by the heat generation means for fixing a toner image on a record medium, and energization means for intermittently energizing the heat generation means for adjusting the temperature of the heating roller has been designed. This kind of fuser is used with a copier, a laser printer, etc., for forming a toner image by electrophotography, for example, to heat and fix toner transferred onto a record medium such as paper from a photoconductor drum, etc. This kind of fuser can use a heater implemented as a halogen lamp, etc., for example, as heat generation means, and energization of the lamp can also be controlled through a triac, etc., so that the surface of the heating roller containing the lamp reaches any desired temperature.

However, a large current called rush current flows just after energization of the lamp is started. Thus, to use a copier, etc., using a power supply common to a lighting fixture in an office, etc., the power supply voltage of the lighting fixture lowers each time the rush current flows. If lowering of the voltage occurs at a frequency in the neighborhood of 8.8 Hz, human beings feel it as displeasing flicker of illumination light. In recent years, a large lamp of about 10 kw has been increasingly used as the lamp as the heat generation means; to suppress occurrence of flicker accompanying the rush current is an urgent problem. To solve this problem, to suppress occurrence of flicker, the following toner image fuser is known: When energization means executes energization, discontinuous energization is executed in a pulstile manner at the energization starting time, thereby dividing rush current into pulses and raising the voltage lowering frequency caused by the rush current for changing the strength of illumination light at a high frequency preventing human beings from feeling displeasure and well suppressing occurrence of flicker. (For example, refer to JP-A-11-095606)

As a method of generating such discontinuous pulses, energization means maybe provided with energization start time energization control means for discontinuously executing energization in a pulsatile manner at the energization start time, and the energization start time energization control means may be made up of energization control means for executing energization if a control signal is on when the voltage value of AC power supply crosses zero and stopping energization if the control signal is off when the voltage value of the AC power supply crosses zero and control signal generation means for turning on/off the control signal. As energization is thus started at the zero crossing time, the rush current can be reduced.

SUMMARY OF THE INVENTION

Hitherto, the control signal generation means has repeated three times turning on the control signal for the time of a half the power supply period and turning off the control signal for the power supply period, as shown in FIG. 13.

However, the energization control means executes energization if the control signal is on when the voltage value of the AC power supply crosses zero and stops energization if the control signal is off when the voltage value of the AC power supply crosses zero. Thus, as shown in FIG. 13, if the on-to-off or off-to-on transition point of the control signal and the zero crossing point of the voltage value of the AC power supply match, the control signal may be off or may be on at the zero cross point as the AC power supply period fluctuates or the on/off time of the control signal fluctuates. That is, the control signal is turned on just before the zero crossing point of the power supply in FIG. 13; in fact, however, for example, after the zero crossing point of the power supply is passed through, the control signal may be turned on and then may be turned off just before the next zero crossing point as the period of the commercial power supply as AC power supply fluctuates or the on/off time of the control signal fluctuates. Thus, for example, the control signal when the voltage value of the AC power supply crosses zero may be successively off or may be successively on. If the control signal is off every time when the voltage value of the AC power supply crosses zero, heating means is not energized in a pulsatile manner at all and it is made impossible to suppress occurrence of flicker, as shown in HEATER CURRENT A in FIG. 13. If the control signal is successively on, every time the voltage value of the AC power supply crosses zero, the heating means is energized in a pulsatile manner for one power supply period, for example, as shown in HEATER CURRENT B in FIG. 13, and the pulsatile current is put into a low frequency, lowering the flicker reducing degree.

A heating unit capable of reducing flicker more reliably is disclosed herein.

According to one aspect of the invention, a heating apparatus includes: a heat unit that generates heat in response to energization; and an energization unit that supplies AC power to the heat unit and energizes the heat unit discontinuously in a pulsatile manner at least when energization of the heat unit is started. The energization unit turns on and off a control signal twice or more and sets an on and off period defined by sum of an on time and an off time of the control signal to a period not matching an integral multiple of a half the period of the AC power. The energization unit is configured to energize the heat unit when a control signal is on and when a voltage value of an AC power crosses zero and to stop energizing the heat unit when the control signal is off and when the voltage value of the AC power crosses zero.

The energization unit turns on and off the control signal twice or more and sets an on and off period defined by sum of an on time and an off time of the control signal to a period not matching an integral multiple of a half the period of the AC power supply. That is, $T \neq \frac{1}{2} \times T_{AC} \times n$ (n is an integer) where T is the period of the control signal and $T_{AC}$ is the power supply period.

According to another aspect of the invention, a heating apparatus includes: a heat unit that generates heat in response to energization, and an energization unit that supplies AC power to the heat unit and energizes the heat unit discontinuously in a pulsatile manner at least when energization of the heat unit is started. The energization unit turns on and off a control signal and detects a voltage value of the AC power crossing zero and switches on and off the control signal based on the detection result. The energization unit is configured to energize the heat unit when a control signal is on and when a voltage value of an AC power crosses zero and to stop energizing the heat unit when the control signal is off and when the voltage value of the AC power crosses zero.

Therefore, the control signal when the voltage value of the AC power crosses zero can be easily determined to be on or off more reliably than that in the related art. Thus, the pulsatile current can be put into a high frequency and the rush current can be lessened more reliably than in the related art. Consequently, flicker can be reduced more reliably than in the related art.

BRIEF DESCRIPTION OF THE DRAWINGS

The present invention may be more readily described with reference to the accompanying drawings, in which.

DETAILED DESCRIPTION OF THE PREFERRED EMBODIMENTS

Referring now to the accompanying drawings, there are shown preferred embodiments of the invention.

Figure 1:
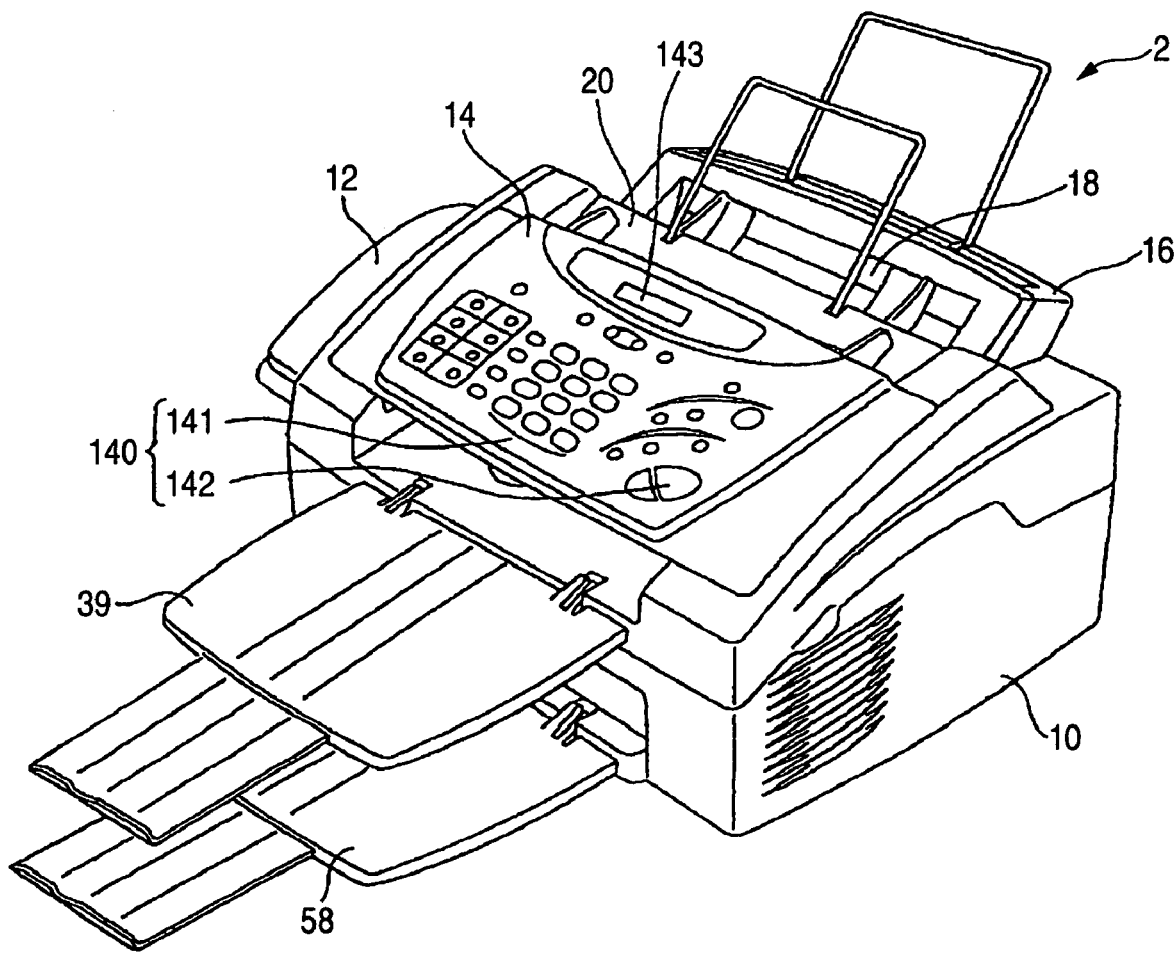
FIG. 1 is a perspective view to represent the appearance of a facsimile machine according to an embodiment of the invention.
Figure 2:
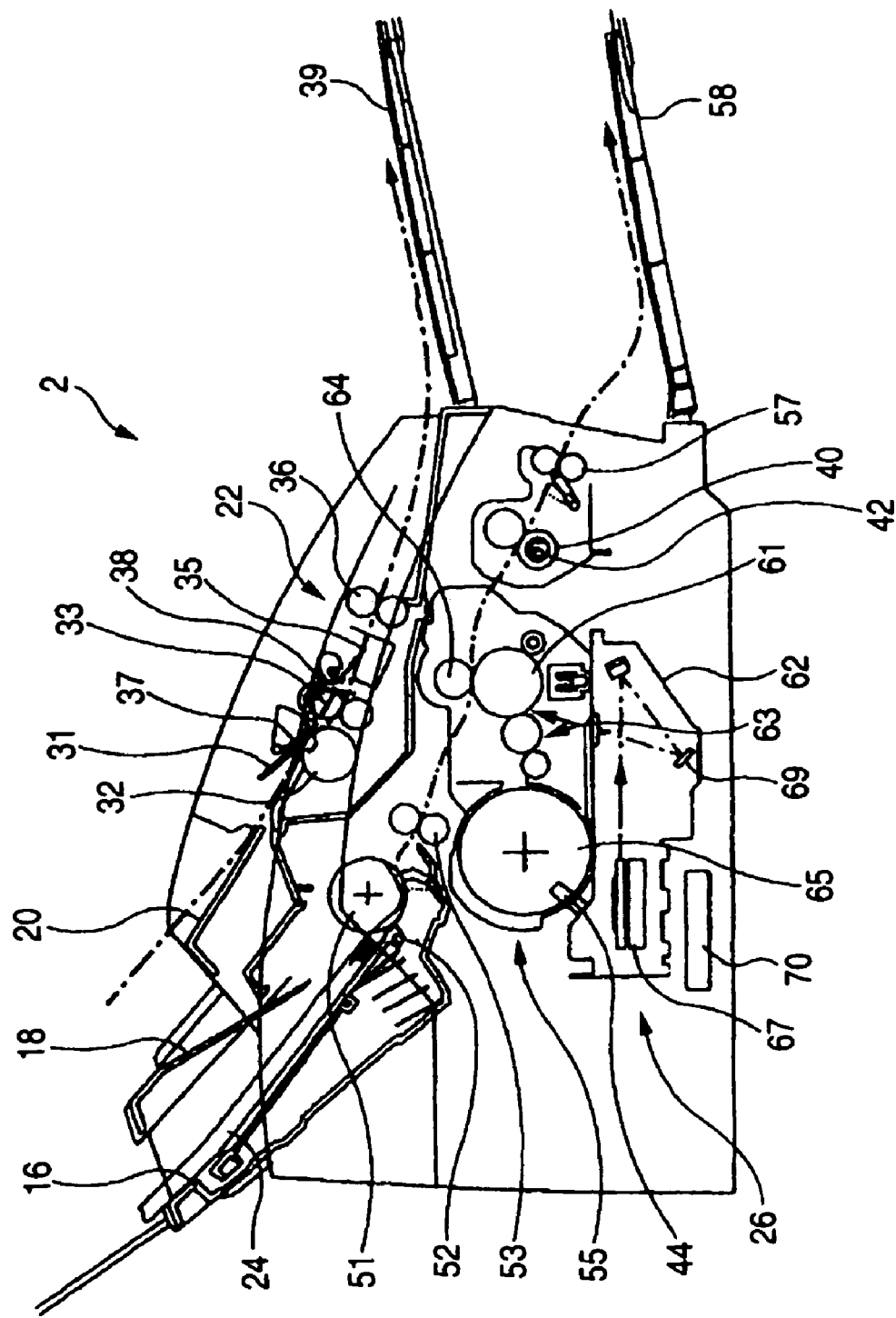
FIG. 2 is a schematic representation to represent the internal mechanism of the facsimile machine in FIG. 1.

FIG. 1 is a perspective view to represent the appearance of a facsimile machine incorporating the invention. FIG. 2 is a schematic representation to represent the internal mechanism of the facsimile machine.

1) External Configuration

A facsimile machine 2 has a usual facsimile machine function (facsimile function) of reading an image from an original, transmitting the image data to another facsimile machine as facsimile data (FAX data) over a telephone line, receiving facsimile data (FAX data) transmitted from another facsimile machine over a telephone line, and forming the image on record paper. In addition, the facsimile machine 2 has a printer function of receiving code data (PC data), etc., transmitted through a printer cable from a personal computer, a word processor, etc., and forming the image responsive to the data on record paper and a copy function of reading an image from an original and copying the image to record paper based on the image data.

The facsimile machine 2 has a handset 12 attached to a side of a main unit 10 and an operation panel 14 placed on the front of the top, as shown in FIG. 1. The facsimile machine 2 also has a first paper feed tray 16 for record paper at the rear of the top of the main unit 10, a second paper feed tray 18 for record paper above the first paper feed tray, and a third paper feed tray 20 for an original above the second paper feed tray.

The operation panel 14 includes various operation keys 140 such as numeric keys 141 for entering the FAX number of the called party and a start button 142, and a liquid crystal display 143 for displaying information relevant to various functions, as shown in FIG. 1.

2) Internal Configuration

The main unit 10 contains a scanner section 22 for reading an image from the original placed on the third paper feed tray 20, a record section 26 for forming an image on record paper 24 stored in the first paper feed tray 16 or the second paper feed tray 18, and a control unit 70 for controlling the sections, as shown in FIG. 2.

In the scanner section 22, the original placed on the third paper feed tray 20 is taken in the scanner section one sheet at a time by a paper feed mechanism made up of a paper feed roller 32, a separation pad 31, etc. The original is transported by a transport roller 33 to an image reader 35 for reading the image. After the image is read, the original is ejected through an ejection roller 36 to an ejection tray 39 provided on the front of the main unit 10. In addition, the scanner section 22 is provided with an original front sensor 37 for detecting the leading end of the original placed on the third paper feed tray 20 and an original rear sensor 38 for detecting the trailing end of the original in the passage from the third paper feed tray 20 to the paper feed mechanism.

In the record section 26, the record paper 24 stored in the first paper feed tray 16 or the second paper feed tray 18 is taken in the record section one sheet at a time by a paper feed mechanism made up of a paper feed roller 51, a separation pad 52, etc. The record paper 24 is sent through a transport roller 53 to an image formation apparatus 55, which then forms an image on the record paper 24 in toner. After the image is formed, the record paper 24 is sent to a fuser 40, which then fixes the toner and then the record paper 24 is ejected through a paper ejection roller 57 to a paper ejection tray 58 provided on the front of the main unit 10.

The image formation apparatus 55 is made up of a photoconductor drum 61, a laser light scanner 62 for applying laser light to the photoconductor drum 61 and forming an electrostatic latent image on the surface of the photoconductive drum, a developing unit 63 for depositing toner on the photoconductor drum 61 after the electrostatic latent image is formed, a transfer roller 64 for transferring the toner deposited on the photoconductor drum 61 to the record paper 24, and a toner tank 65 for storing toner. Further, the laser light scanner 62 includes a laser emission section 67 made up of a laser diode, a polygon mirror, etc., for emitting laser light in accordance with a command from the control unit 70, a reflecting mirror 69 for introducing the laser light emitted from the laser emission section 67 into the photoconductor drum 61, and the like. That is, the record section 26 is configured as a laser printer and forms the image on the record paper 24 in accordance with a command from the control unit 70.

3) Main Configuration

Figure 3:
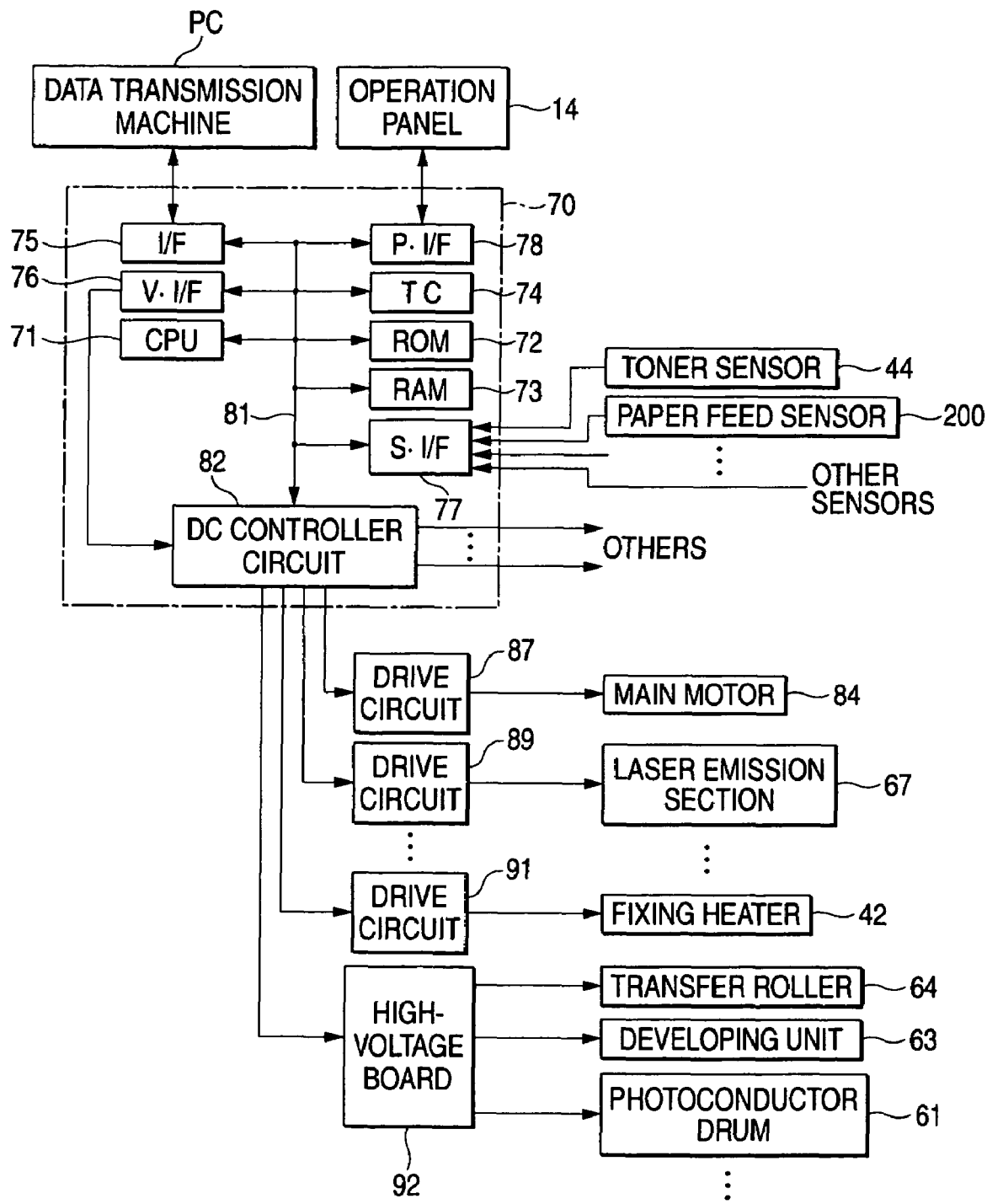
FIG. 3 is a block diagram to show the configuration of a control unit and components related to the control unit.

Next, the control unit 70 will be discussed. FIG. 3 is a block diagram to show the configuration of the control unit 70 and the components related to the control unit 70. The control unit 70 includes a CPU 71, ROM 72 storing various control programs, RAM 73 including various types of memory such as a reception buffer for receiving and storing transmission data transmitted from an external data transmission machine PC such as a personal computer or a host computer, a timing control circuit (TC) 74 for generating a timing signal for the write/read timing of reception data into/from the reception buffer, an interface (I/F) 75 for receiving transmitted print data, a video interface (V I/F) 76 having a scan buffer for outputting print information converted into bit image data to a DC controller circuit 82 in order, a sensor interface (S I/F) 77 for receiving detection signals from a toner sensor 44, paper feed sensors 200, such as the original front sensor 37 and the original rear sensor 38, and other sensors, and a panel interface (P I/F) 78 for receiving a switch signal for selection of any of various control modes from the operation panel 14; the components are connected to the CPU 71 by a bus 81.

Connected to the DC controller circuit 82 are a drive circuit 87 for a main motor 84 for driving the paper feed transport mechanism section made up of the paper feed roller 51, the transport roller 53, the photoconductor drum 61, etc., and the ejection transport mechanism section made up of a roller of the fuser 40 and the paper ejection roller 57, a drive circuit 89 for driving the laser diode, the polygon mirror, etc., making up the laser emission section 67, a drive circuit 91 for a fixing heater 42 implemented as a halogen lamp in the fuser 40, and a high-voltage board 92 for supplying high voltage to the photoconductor drum 61, the transfer roller 64, the developing unit 63, etc.

The ROM 72 previously stores a memory management program for managing the memory capacities and the top addresses of memories such as font memory storing print dot pattern data concerning a large number of characters of letters, symbols, etc., and the reception data buffer, print image memory, etc., provided in the RAM 73 and the like in addition to the various control programs for providing the above-described functions.

Figure 4:
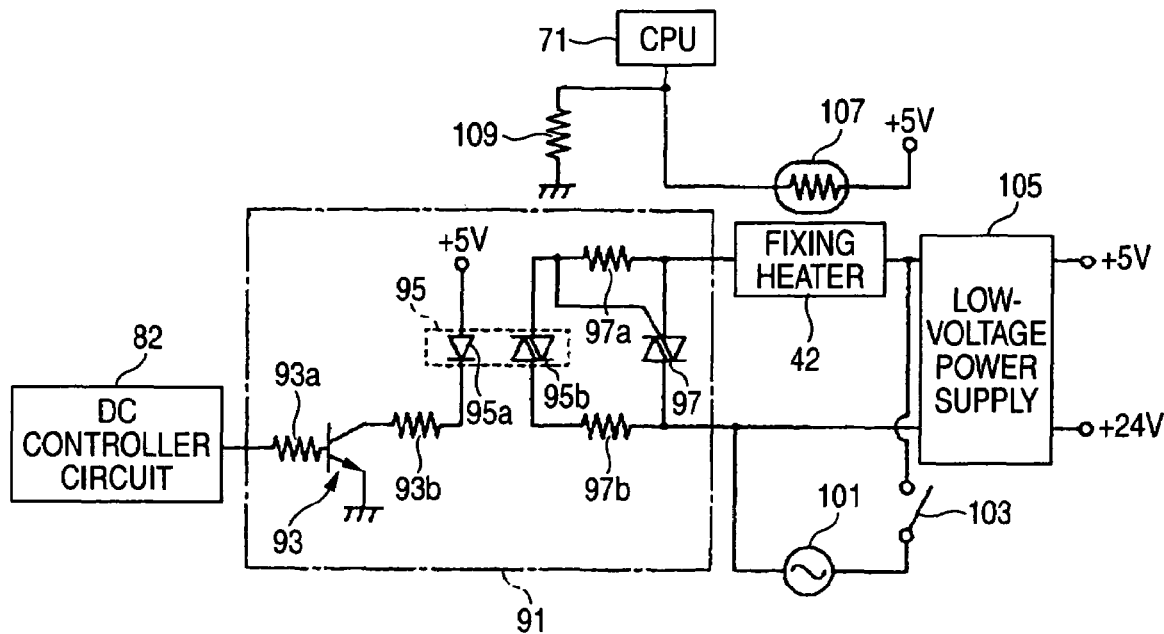
FIG. 4 is a schematic representation to show the configuration of a drive circuit and its periphery.

Next, the configuration of the drive circuit 91 and its periphery will be discussed in detail with FIG. 4. As shown in FIG. 4, the drive circuit 91 is made up of elements such as a transistor 93, a photo-triac coupler 95, and a triac 97 and resistors (described below) as the main part. The DC controller circuit 82 is connected to the base of the transistor 93 via a resistor 93a for switching the transistor 93. A light emitting diode 95a of the photo-triac coupler 95 is connected to the collector of the transistor 93 via a resistor 93b, and both ends of the triac 97 are connected to both ends of a triac 95b of the photo-triac coupler 95 via resistors 97a and 97b. The photo-triac coupler 95 is provided with zero crossing detection. When the voltage value across the triac 95b crosses zero, if the light emitting diode 95a emits light, the triac 95b is turned on; when the voltage value across the triac 95b crosses zero, if the light emitting diode 95a does not emit light, the triac 95b is turned off. The gate of the triac 97 is connected between the resistor 97a and the triac 95b. When a current flows into the gate of the triac 97, a gate current responsive to the voltage drop is supplied.

A 100-VAC commercial power supply 101, a power switch 103, and the above-mentioned fixing heater 42 are connected in series between both ends of the triac 97. Further, a low-voltage power supply 105 for outputting DC voltages of 5 V and 24 V is connected to both ends of the series circuit made up of the commercial power supply 101 and the power switch 103.

A thermister 107 is disposed in the proximity of the fixing heater 42. The thermister 107 is grounded at one end via a resistor 109 and is connected at an opposite end to a 5-V DC power supply, and the potential between the thermister 107 and the resistor 109 is input to the CPU 71 through an A/D converter (not shown). Thus, the CPU 71 can read the potential, thereby detecting the temperature in the proximity of the fixing heater 42. Then, the CPU 71 switches on and off the transistor 93 based on the temperature in the proximity of the fixing heater 42 through the DC controller circuit 82. When the voltage value across the triac 95b crosses zero, if the transistor 93 is on, the photo-triac coupler 95 is turned on and a current flows into the gate of the triac 97, turning on the triac 97. When the voltage value across the triac 95b crosses zero, if the transistor 93 is off, the photo-triac coupler 95 is turned off and no current flows into the gate of the triac 97, turning off the triac 97. Accordingly, the fixing heater 42 is switched between energization and non-energization.

Figure 5:
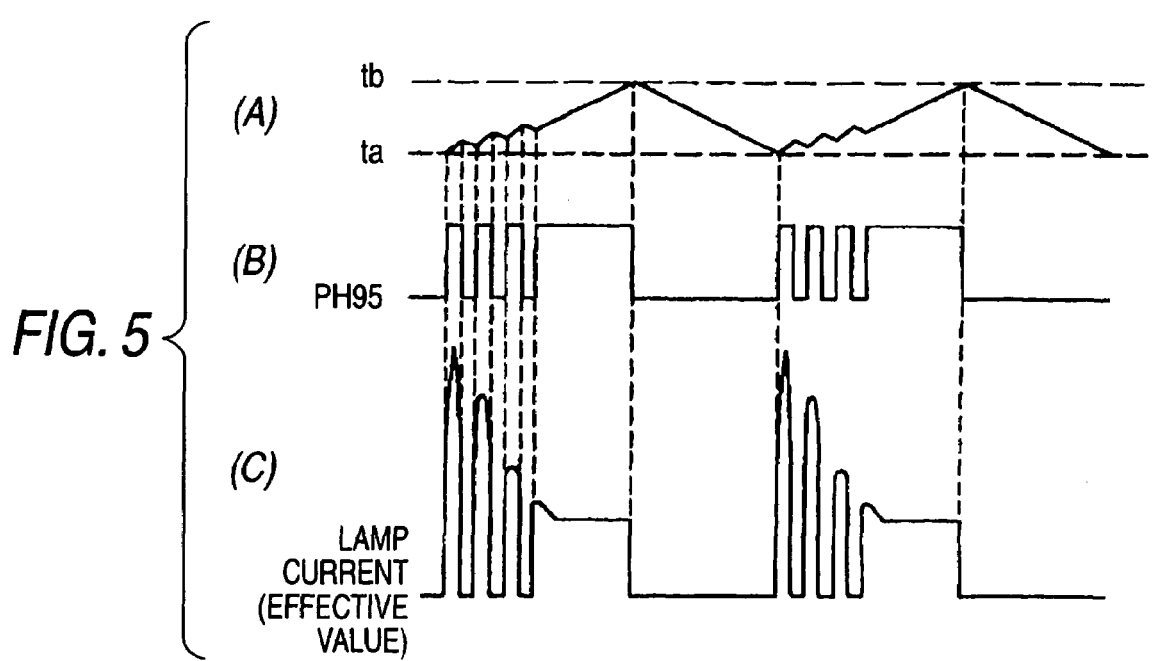
FIG. 5 is a time chart to represent energization control of the drive circuit.

In the described fuser 40, the CPU 71 controls the temperature in the proximity of the fixing heater 42 detected through the thermister 107 between maximum value tb and minimum value ta for making it possible to fix toner. That is, as shown in FIG. 5; when temperature (A) lowers to ta, the photo-triac coupler 95 (PH95) is turned on and is continued on until the temperature rises and reaches tb. Meanwhile, the fixing heater 42 is energized and the temperature rises. When the temperature reaches tb, the photo-triac coupler 95 is turned off and is continued off until the temperature lowers to ta. When the temperature lowers to ta, again the photo-triac coupler 95 is turned on and similar control is repeated.

When the photo-triac coupler 95 is turned on and energization is started, to energize the photo-triac coupler 95 discontinuously in a pulsatile manner, the CPU 71 controls a signal to the drive circuit 91. This signal is active low and in the description that follows, the signal is represented as /ON signal. When the /ON signal output by the CPU 71 is on, the DC controller circuit 82 outputs a signal for turning on the transistor 93. When the /ON signal output by the CPU 71 is off, the DC controller circuit 82 outputs a signal for turning off the transistor 93.

The relationship between /ON control performed by the CPU 71 and the effective value of current flowing into the fixing heater 42 as the /ON signal is controlled is shown in the accompanying drawings and will be discussed below as embodiments:

First Embodiment

When energization is started according to on time $T_{ON}$ and off time $T_{OFF}$ as $T \neq \frac{1}{2} \times T_{AC} \times n$, $T_{ON} \neq \frac{1}{2} \times T_{AC} \times n$, $T_{OFF} \neq \frac{1}{2} \times T_{AC} \times n$ (n is an integer of 1 or more) where $T_{ON}$ is the on time of the /ON signal, $T_{OFF}$ is the off time of the /ON signal, T is the period of the /ON signal ($T_{ON} + T_{OFF}$), and $T_{AC}$ is the period defined by the supplier of the commercial power supply 101, the CPU 71 repeats turning on and off the /ON signal several times and then continuously turns on the /ON signal.

For example, as on time $T_{ON} < T_{AC}/2$, off time $T_{OFF}$ is set to the time in the range of $(3/2)T_{AC} - 2T_{ON} + (T_{AC}/2)n < T_{OFF} <$ $(T_{AC}/2)+(T_{AC}/2)n$ and turning on and off the /ON signal is repeated several times and then the /ON signal is continuously turned on.

For example, $T_{OFF}$ is minimized and $2T_{AC}-2T_{ON}<T_{OFF}<T_{AC}$ is set.

To consider variations in the period of the commercial power supply 101, as the period of the commercial power supply 101, $T_{AC'}=T_{AC}\pm a$, off time $T_{OFF}$ may be set to the time in the range of $(3/2)T_{AC'}-2T_{ON}+(T_{AC}/2)n<T_{OFF}<T_{AC'}+(T_{AC}/2)n$ and turning on and off the /ON signal may be repeated several times and then the /ON signal may be continuously turned on. Here a is the variation in the period $T_{AC}$.

Particularly, considering that on time $T_{ON}$ and off time $T_{OFF}$ vary, to most lessen the number of pulses, $T_{ON}=T_{AC}'\pm\alpha-m$, $(3/2)T_{AC'}-2(T_{AC}\pm\alpha-m)+(T_{AC}/2)n<T_{OFF}\pm\beta<(T_{AC}/2)+(T'/2)n$, namely, $(n-1)(T_{AC}/2)\pm2\alpha+2m<T_{OFF}\pm\beta<(1+n)T_{AC'}$ where $\alpha$ is the variation in on time $T_{ON}$, $\beta$ is the variation in off time $T_{OFF}$, and m is a margin.

For example, as on time $T_{ON}>T/2$, off time $T_{OFF}$ is set to the time in the range of $T_{AC}/2+(T_{AC}/2)\times(n-1)<T_{OFF}<T_{AC}+(T/2)\times(n-1)$ and when energization is started, turning on and off the /ON signal is repeated several times and then the /ON signal is continuously turned on. For example, $(T_{AC}/2)<T_{OFF}<T_{AC}$.

Likewise, considering the variations, off time $T_{OFF}$ may be set to the time in the range of $$n\times T_{AC}/2<T_{OFF}\pm\beta<\{(n+1)/2\}\times T_{AC'}$$

and turning on and off the /ON signal may be repeated several times and then the /ON signal may be continuously turned on.

Figure 6:
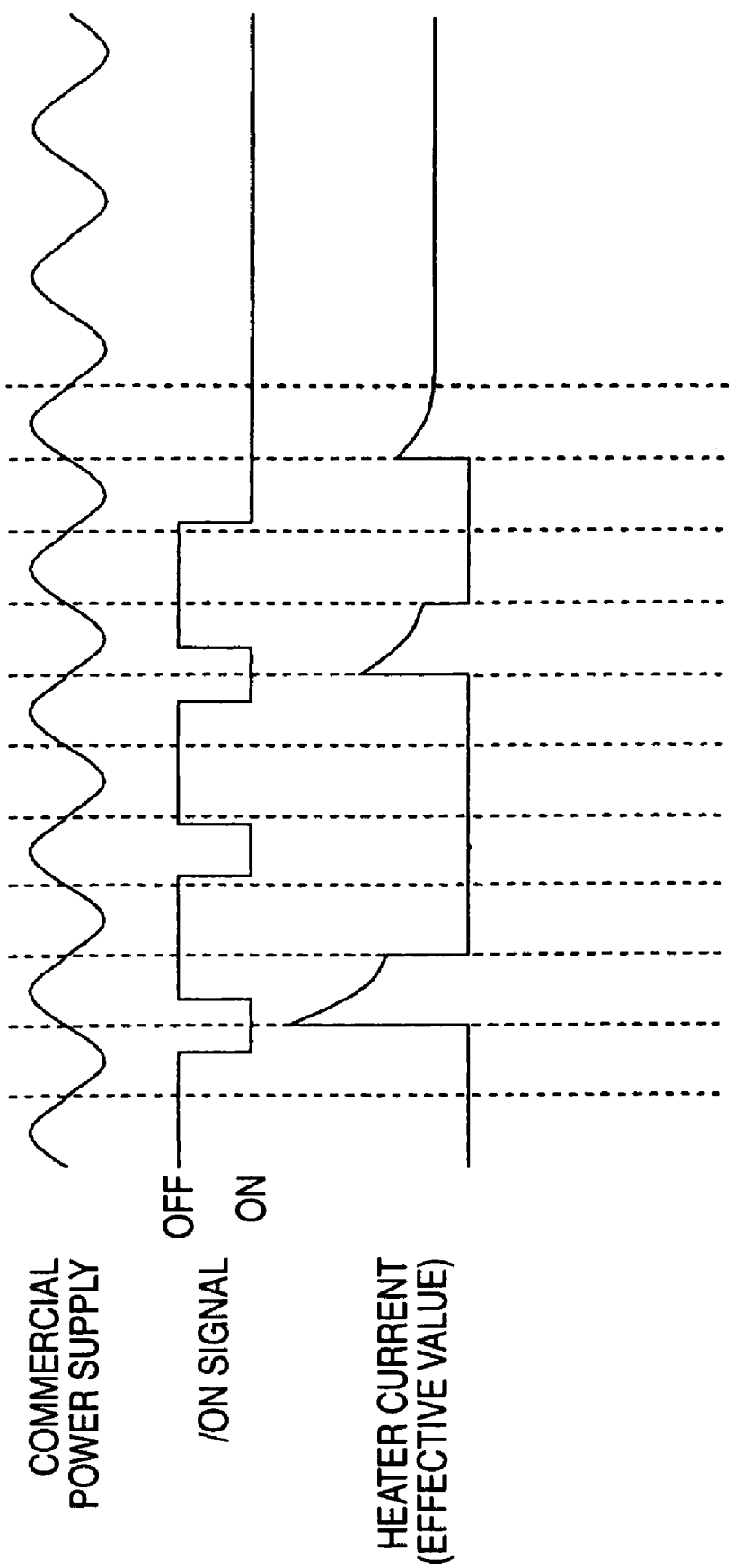
FIG. 6 is a time chart to show the relationship between a /ON signal and the effective value of a current flowing into a fixing heater in a first embodiment of the invention.

FIG. 6 shows an example of the relationship the /ON signal when on time $T_{ON}$ and off time $T_{OFF}$ are set in the above-mentioned ranges and the effective value of current flowing into the fixing heater 42. In the example in FIG. 6, the CPU 71 turns on and off the /ON signal three times.

As shown in FIG. 6, the on and off period of the /ON signal is set to a period not matching an integral multiple of a half the period of the commercial power supply 101. Accordingly, if the voltage value of the commercial power supply 101 does not cross zero and a pulsatile current does not flow into the fixing heater 42 when the /ON signal is turned on to energize the fixing heater 42 at the second pulse, when the /ON signal is turned on to energize the fixing heater 42 at the third pulse, the voltage value of the commercial power supply 101 crosses zero reliably and a pulsatile current can be allowed to flow into the fixing heater 42. Thus, if $T\ne\frac{1}{2}T_{AC}\times n$ (n is an integer), the possibility that a disadvantage will occur consecutively can be lowered. Consequently, flicker can be reduced.

That is, if the control signal when the voltage value of the AC power supply crosses zero is off and pulse-like energization cannot be executed although pulse-like energization is to be started, if the relationship between the period of the control signal and the period of the AC power supply is $T=\frac{1}{2}\times T_{AC}\times n$ (n is an integer), the probability that the control signal will be turned off in T time is high, and the possibility that pulse-like energization will be unable to be executed is high.

In contrast, although pulse-like energization is to be terminated, if the control signal when the voltage value of the AC power supply crosses zero is on, continuous energization is executed and consequently the pulse-like current is put into a low frequency, lowering the flicker reducing degree. Particularly, if the relationship between the period of the control signal and the period of the AC power supply is $T=\frac{1}{2}\times T_{AC}\times n$ (n is an integer), the probability that the control signal will be turned off in T time is high, and the possibility that continuous energization rather than pulse-like energization will be executed and flicker will not be reduced is high.

Thus, if T is set to $\frac{1}{2}\times T_{AC}\times n$ (n is an integer), it is assumed that a disadvantage occurs consecutively. However, such a disadvantage can be circumvented when $T\ne\frac{1}{2}\times T_{AC}\times n$ (n is an integer).

Preferably, it is advisable to set the on time $T_{ON}$ of the control signal to a time not matching the time of an integral multiple of a half the period of the AC power supply. It is also advisable to set the off time $T_{OFF}$ of the control signal to a time not matching the time of an integral multiple of a half the period of the AC power supply. If the on time or the off time matches the time of an integral multiple of a half the period of the AC power supply, the pulse-like current may flow (or stop) for one period of the AC power supply, for example, although it is to be allowed to flow (or stop) for a half period of the AC power supply. If pulse-like current is to be allowed to flow into the heater as intended, the output time of the control signal which is on or off should not be matched with an integral multiple of a half the period of the AC power supply.

Particularly, it is advisable to set on time $T_{ON}$ to a time shorter than a half the period of the commercial power supply 101, as shown in FIG. 6. In doing so, as shown in FIG. 6, the pulse energization time of the fixing heater 42 can be suppressed to a half the period of the commercial power supply 101, so that the pulsatile current can be put into a high frequency and consequently flicker can be reduced.

Particularly, it is advisable to set off time $T_{OFF}$ to a time in the range of one to six times the time of a half the period of the commercial power supply 101, as shown in FIG. 6. In doing so, as shown in FIG. 6, the situation in which the fixing heater 42 is not energized for a long time can be circumvented and rush current can be lessened and consequently flicker can be reduced.

Particularly, when the AC frequency of the commercial power supply is 50 Hz, if on time $T_{ON}$ is set to 8.5 ms and off time $T_{OFF}$ is set to 19 ms, the very favorable result can be provided. In the configuration of the embodiment, an additional circuit such as a zero crossing detection circuit as in the configuration of a third embodiment described later is not required and the excellent advantage can be provided at low cost.

Second Embodiment

Figure 7:
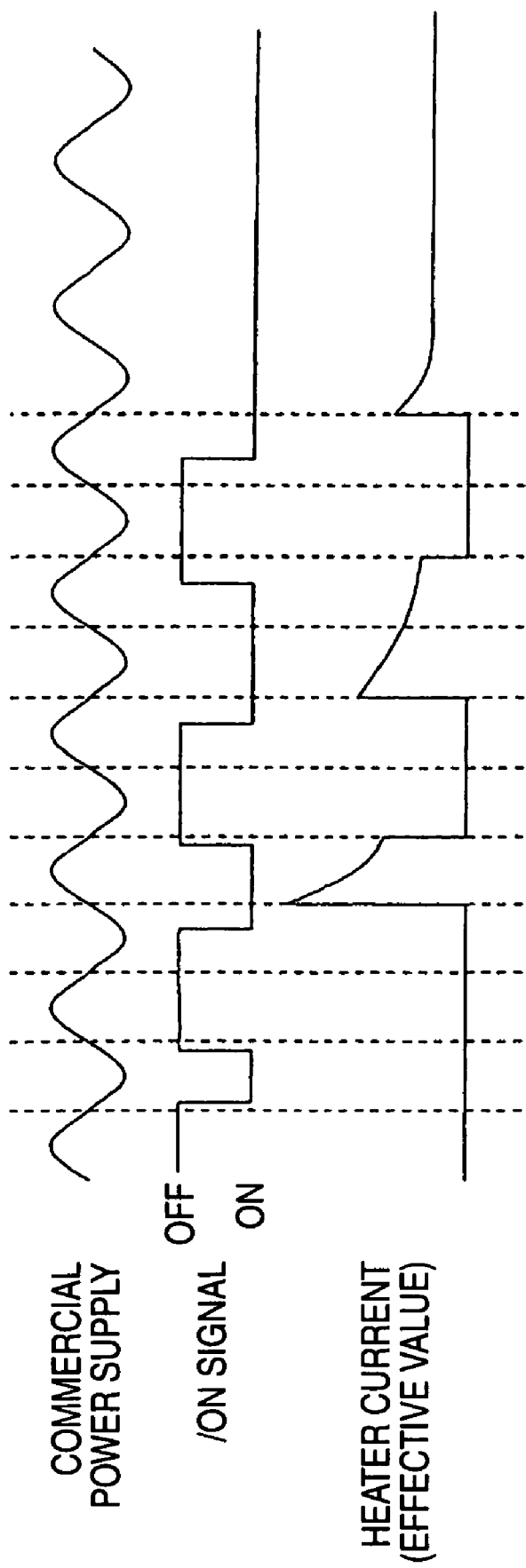
FIG. 7 is a time chart to show the relationship between a /ON signal and the effective value of a current flowing into a fixing heater in a second embodiment of the invention.

In a second embodiment, the configuration of the first embodiment is used and further the CPU 71 performs control for prolonging on time $T_{ON}$ with the passage of time from the energization start time as shown in FIG. 7. In the second embodiment, on time $T_{ON}$ when the /ON signal is first turned on to energize the fixing heater 42 with the first pulse is set as $T_{ON}<\frac{1}{2}\times T_{AC}$ and then on time $T_{ON}$ is prolonged gradually. Thus, for example, as in FIG. 7, when the CPU 71 first turns on the /ON signal, if the voltage value of the commercial power supply 101 does not cross zero and the fixing heater 42 cannot be energized in a pulsatile manner, when the /ON signal is next turned on, the voltage value of the commercial power supply 101 crosses zero and the fixing heater 42 can be energized in a pulsatile manner. The first pulse width with the largest rush current can be made small and when it is passed through, the pulse width can be gradually widened for causing the fixing heater 42 to generate heat early. That is, when the peak current is much, the pulse can be made short. Since the effect on flicker lessens with a decrease in the peak current, on time $T_{ON}$ of the fixing heater 42 can be prolonged. Consequently, the fixing heater 42 can also be caused to generate heat early.

Third Embodiment

Figure 8:
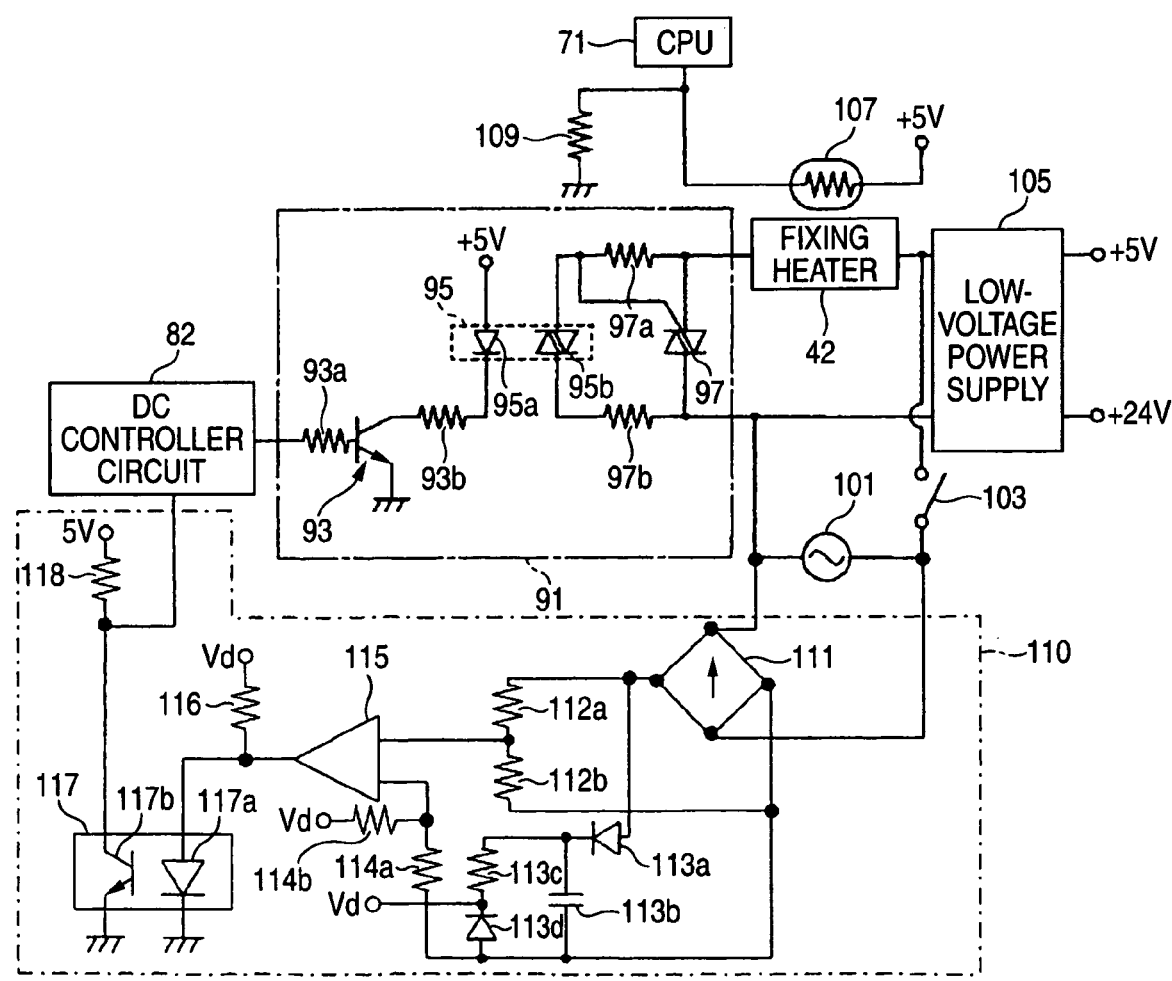
FIG. 8 is a schematic representation to show the configuration of a drive circuit, a zero crossing detection circuit, and their periphery in a third embodiment of the invention.

In a third embodiment of the invention, as shown in FIG. 8, a zero crossing detection circuit 110 for outputting an on signal to the DC controller circuit 82 when the voltage value of the commercial power supply 101 crosses zero is added to the circuitry shown in the block diagram of FIG. 3 and FIG. 4. The zero crossing detection circuit 110 can adopt the configuration, for example, as shown in FIG. 8. That is, the zero crossing detection circuit 110 includes a circuit for dividing the voltage subjected to full-wave rectification by abridge diode 111 through resistors 112a and 112b for adjusting the input voltage to a comparator 115, a rectification diode 113a for rectifying the voltage subjected to full-wave rectification by the bridge diode 111, a smoothing capacitor 113b for smoothing the voltage rectified by the rectification diode 113a, a resistor 113c, a Zener diode 113d, a circuit for generating reference voltage Vd of the comparator 115 by resistors 114a, 114b, and 116, the comparator 115, a photocoupler 117 having a light emitting diode 117a connected to an output terminal of the comparator 115 and a phototransistor 117b turned on/off in response to light emitted by the light emitting diode 117a, and a resistor 118 connected at one end to +5 V and at an opposite end to the collector of the phototransistor 117b and the DC controller circuit 82. In the zero crossing detection circuit 110, a circuit constant, etc., is set so as to output a zero crossing detection signal shown in FIG. 9 relative to the voltage value of commercial power supply 101 in FIG. 9.

When the signal from the zero crossing detection circuit 110 makes an on to off state transition (at the falling time), the DC controller circuit 82 interrupts the CPU 71 as zero crossing detection. At the zero crossing detection interrupt time, the CPU 71 counts the number of interrupts. When the value of a counter for counting the number of interrupts is 1, the /ON signal is tuned on; when the value is 2, the /ON signal is turned off; when the value is 3, the /ON signal remains off and the counter is reset. Further, the number of times the /ON signal has been turned on is counted. When the number of times the /ON signal has been turned on reaches four, if a zero crossing interrupt occurs, the /ON signal is continuously turned on.

Figure 9:
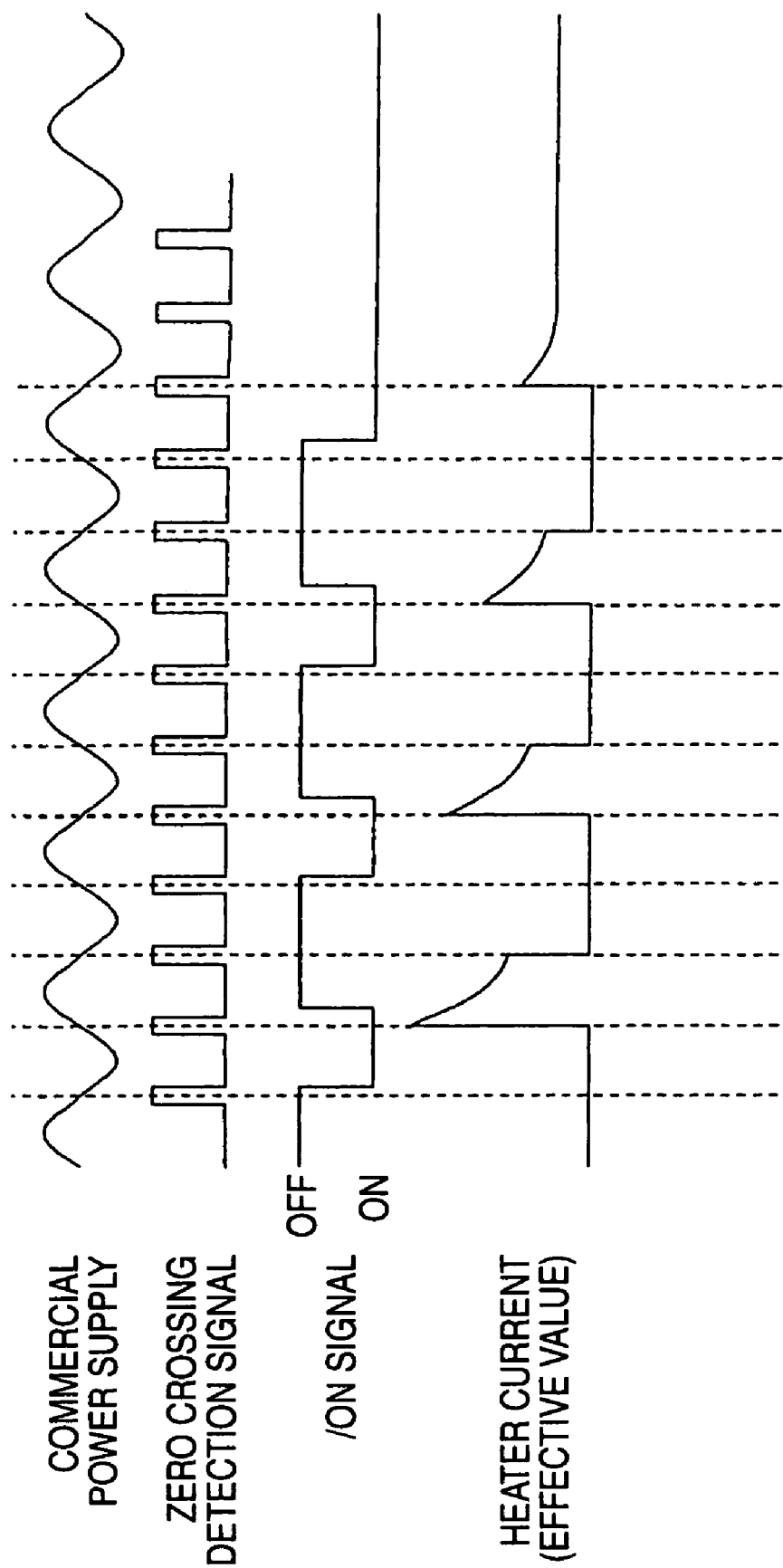
FIG. 9 is a time chart to show the relationship between a /ON signal and the effective value of a current flowing into a fixing heater in the third embodiment of the invention.

Consequently, at the timing shown in FIG. 9, turning on and off the /ON signal is repeated three times and the effective value of current flowing into the fixing heater 42 becomes the value shown in FIG. 9.

Thus, the /ON signal when the voltage value of the commercial power supply 101 crosses zero can be determined to be on or off more reliably than that in the related art. Therefore, the pulsatile current can be put into a high frequency and the rush current can be lessened more reliably than in the related art. Consequently, flicker can be reduced more reliably than in the related art.

If the number of count times required by the time the /ON signal is switched from on to off is increased with the passage of time from the energization start time, the first pulse width with the largest rush current can be made small and when it is passed through, the pulse width can be gradually widened for causing the fixing heater 42 to generate heat early as in the example shown in FIG. 7 in the second embodiment.

For example, the CPU 71 may detect only the first zero crossing time according to a zero crossing detection interrupt and may control the /ON signal and in the later control of the /ON signal, the CPU 71 or a timer may count on time $T_{ON}$, Off time $T_{OFF}$ shown in the first or second embodiment and the /ON signal may be controlled based on the counted time.

Fourth Embodiment

In a fourth embodiment of the invention, a twin heater is provided which includes a fixing heater and a drive circuit having a similar configuration to that of the fixing heater 42 and the drive circuit 91 as well as the fixing heater 42 and the drive circuit 91 in the configuration of the first embodiment. The former fixing heater is called first heater and the latter is called second heater.

Figure 10:
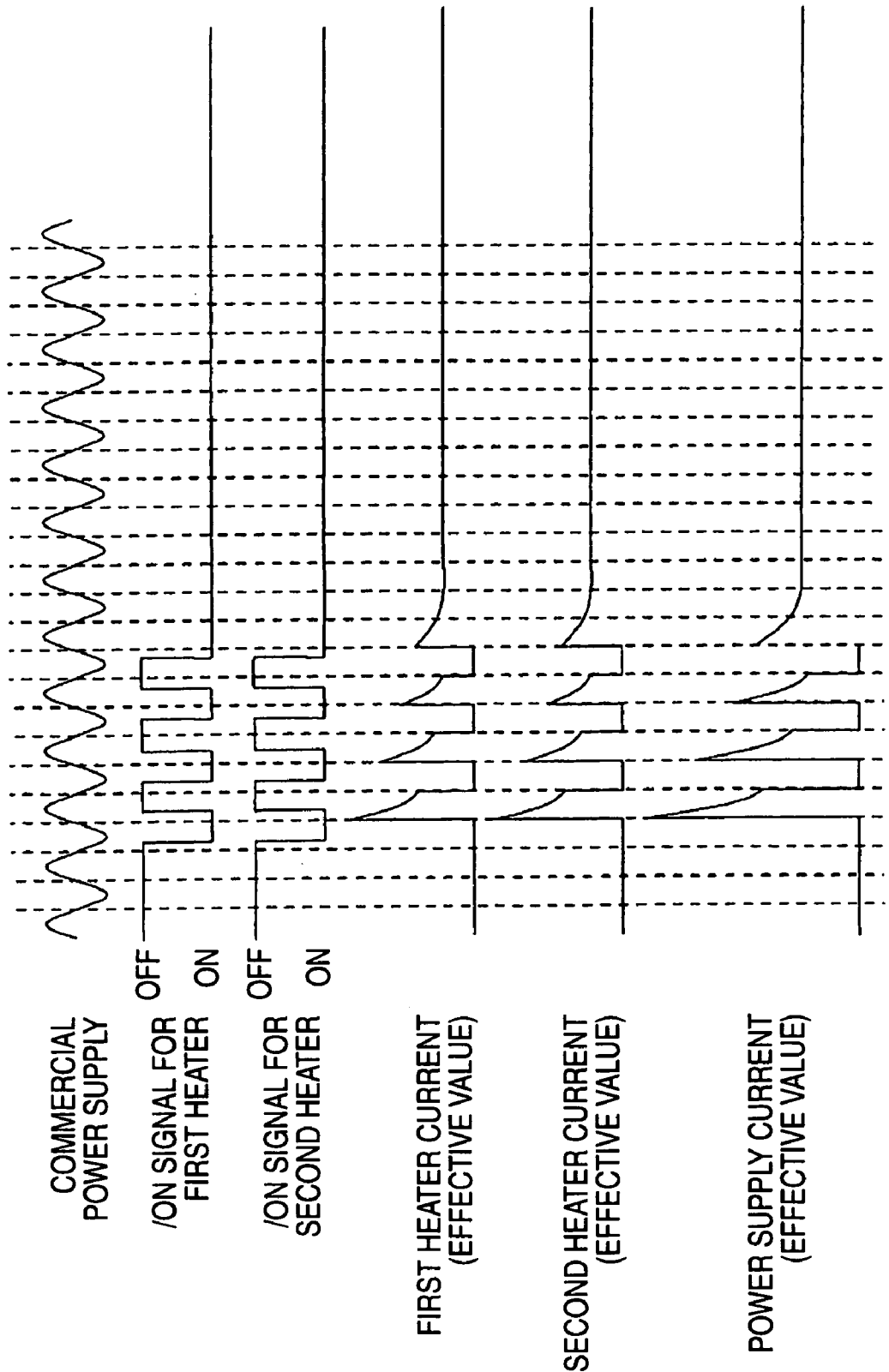
FIG. 10 is a time chart to show the relationship between a /ON signal and the effective value of a current flowing into a fixing heater in a fourth embodiment of the invention.

When energizing the first and second heaters is started, the CPU 71 matches the phase and period of a /ON signal for the first heater with those of a /ON signal for the second heater and controls the /ON signals in the period in the first embodiment, as shown in FIG. 10. That is, the CPU 71 synchronizes the /ON signal for the first heater and the /ON signal for the second heater with each other and controls the /ON signals in the period in the first embodiment. For example, the CPU 71 controls the /ON signal for the first heater and the /ON signal for the second heater at the same time. For example, the CPU 71 continuously controls the /ON signal for the first heater and the /ON signal for the second heater, during which interrupting the CPU 71 is disabled.

Consequently, the timing at which a pulsatile current flows into the first heater and the timing at which a pulsatile current flows into the second heater match, as shown in FIG. 10. Thus, the power supply current resulting from superposing the pulsatile currents also becomes a pulsatile current as the on state discontinues, as shown in FIG. 10. Therefore, the power supply current can be put into a high frequency and consequently flicker can be reduced.

In the embodiment, the configuration of the twin heater has been described, but if the number of fixing heaters is three or more, flicker can also be reduced as control is performed in a similar manner.

Fifth Embodiment

Figure 11:
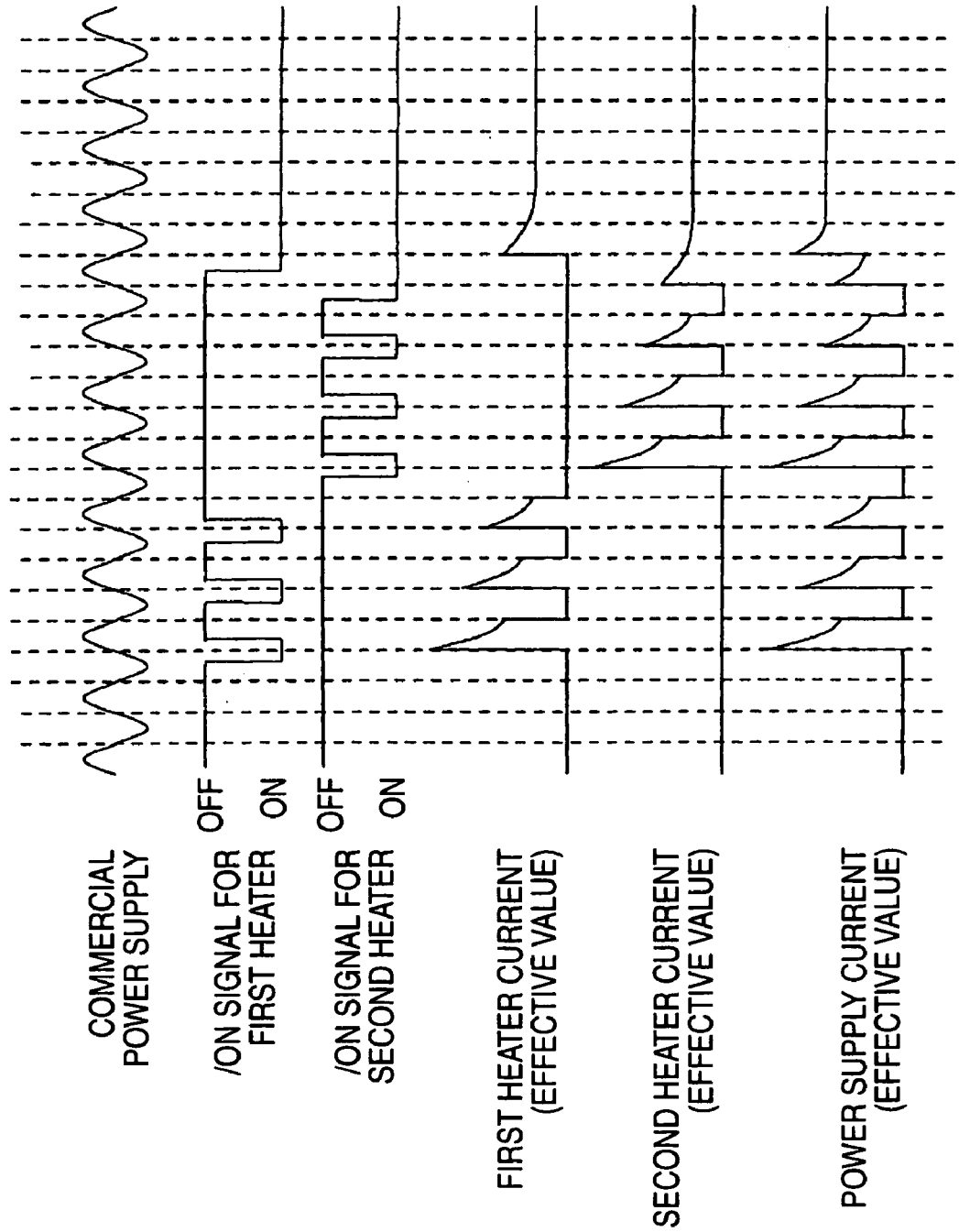
FIG. 11 is a time chart to show the relationship between a /ON signal and the effective value of a current flowing into a fixing heater in a fifth embodiment of the invention.

In a fifth embodiment of the invention, in a similar configuration to that of the fourth embodiment, the method for the CPU 71 to control the /ON signal for the first heater and the /ON signal for the second heater is changed as shown in FIG. 11. That is, if energizing the first heater and energizing the second heater are started at the same time, controlling the /ON signal for the second heater is started with a delay of the pulse control time of the /ON signal for the first heater or more, as shown in FIG. 11. At the pulse control time, turning on and off only either of the /ON signal for the second heater and the /ON signal for the first heater is controlled.

In doing so, a first heater current and a second heater current flow into the first heater and the second heater as shown in FIG. 11 and a power supply current as shown in FIG. 11 flows (in the figures, the effective values are shown). Thus, the power supply current resulting from superposing the first and second heater currents also becomes a pulsatile current and can be put into a high frequency and consequently flicker can be reduced.

Sixth Embodiment

Figure 12:
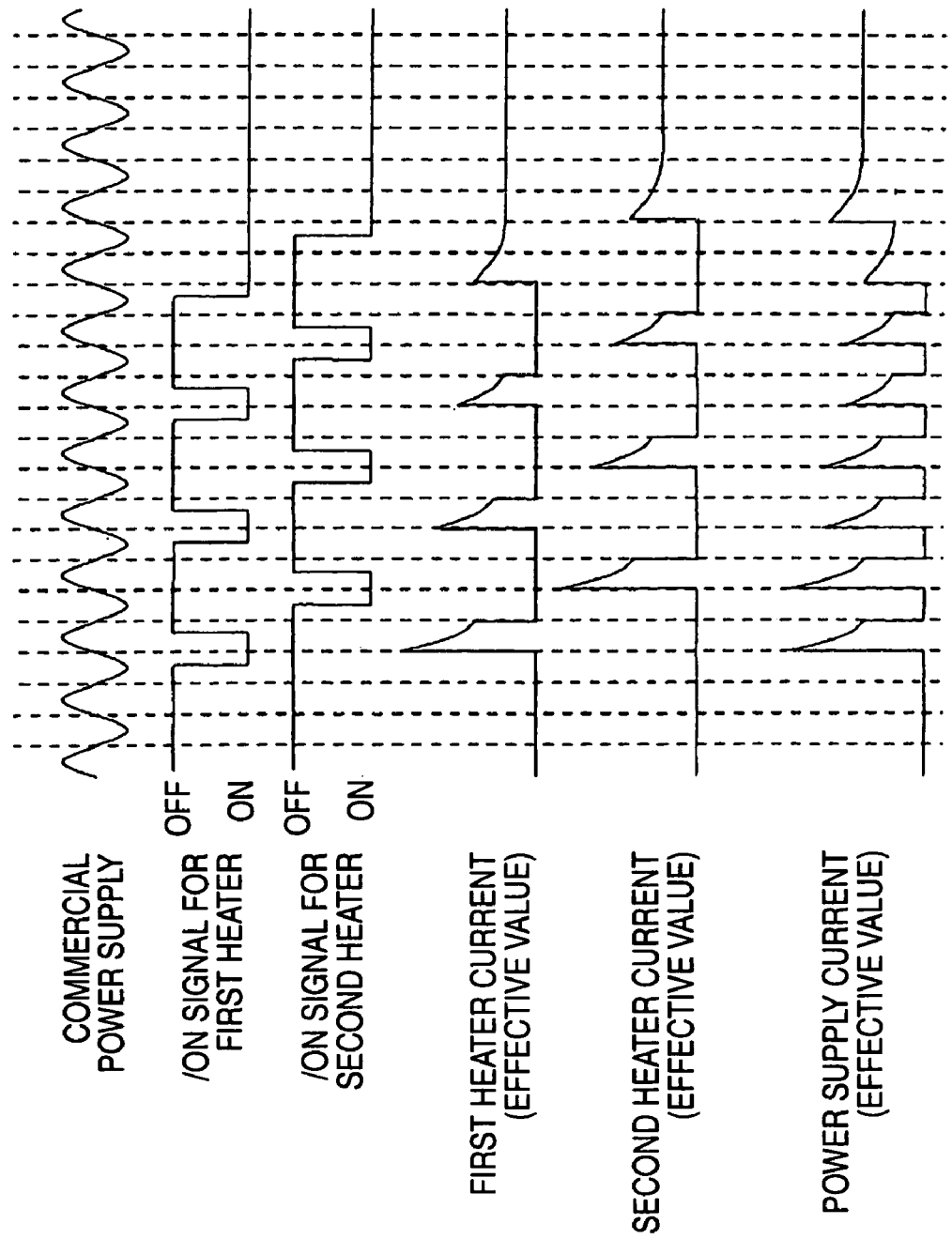
FIG. 12 is a time chart to show the relationship between a /ON signal and the effective value of a current flowing into a fixing heater in a sixth embodiment of the invention.
Figure 13:
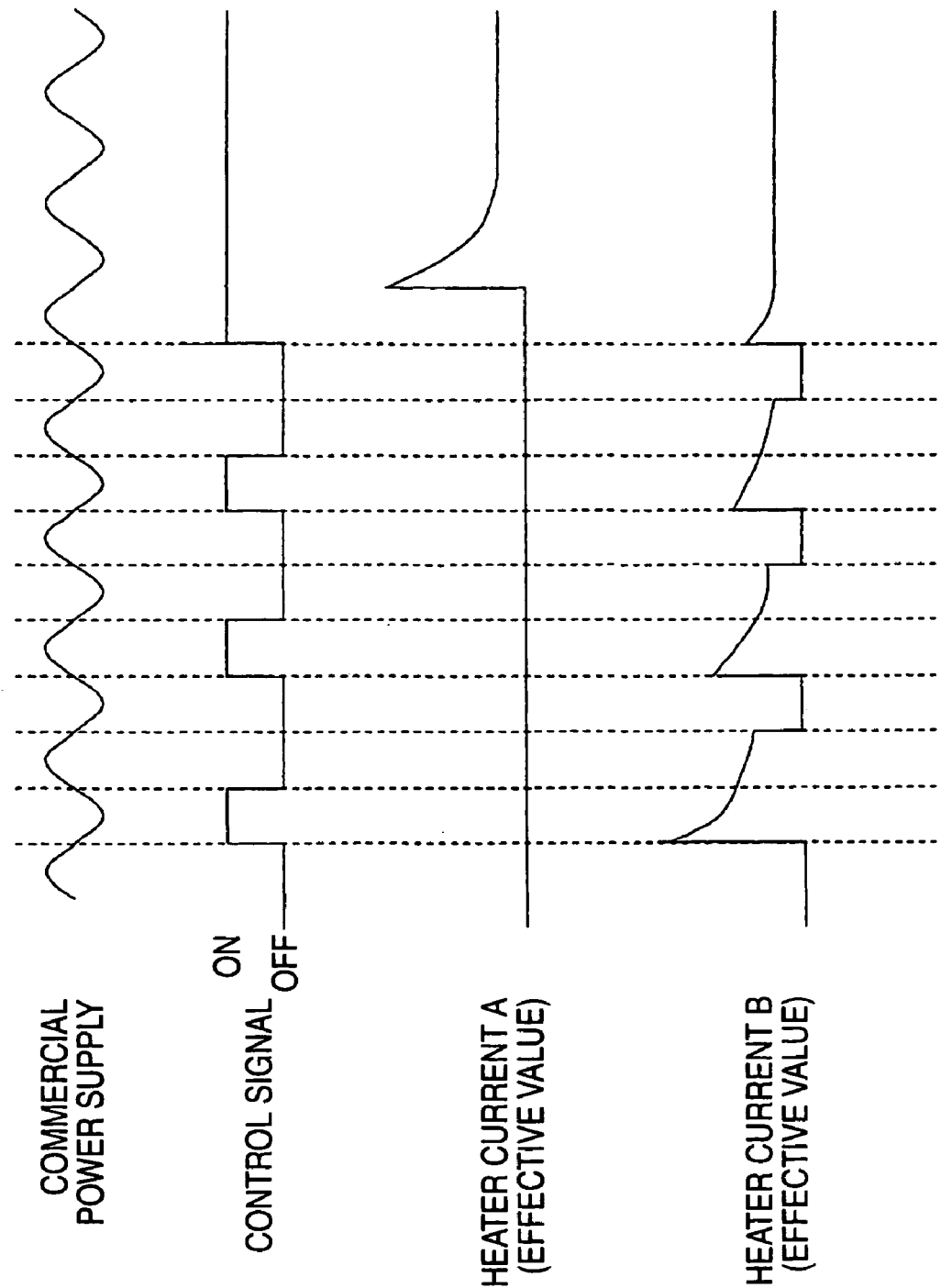
FIG. 13 is a time chart to show the relationship between a /ON signal and the effective value of a current flowing into a fixing heater in a related art example.

In a sixth embodiment of the invention, in a similar configuration to that of the fourth embodiment, the method for the CPU 71 to control the /ON signal for the first heater and the /ON signal for the second heater is changed as shown in FIG. 12. That is, if energizing the first heater and energizing the second heater are started at the same time, the /ON signal for the first heater and the /ON signal for the second heater are turned on and off alternately, as shown in FIG. 12.

In doing so, a first heater current and a second heater current flow into the first heater and the second heater as shown in FIG. 12 and a power supply current as shown in FIG. 12 flows (in the figures, the effective values are shown). Thus, the power supply current resulting from superposing the first and second heater currents also becomes a pulsatile current and can be put into a high frequency and consequently flicker can be reduced.

Particularly, in the fifth embodiment, the /ON signal for the first heater is turned off while the /ON signal for the second heater is controlled after the /ON signal for the first heater is controlled. Thus, there is a possibility that when the /ON signal for the first heater is next turned on, rush current may become comparatively large. However, the sixth embodiment would prevent such a problem from occurring.

The described control signal generation function can also be implemented as hardware only. However, it is greatly advantageous that the heating unit includes a CPU having the control signal generation function. Particularly noticeable in an apparatus including a heater and having one CPU for controlling a plurality of functions as well as the function of the control signal generation or the like, the control signal may be unable to be turned on/off at the accurate timing in a conventional control signal generation function because of the effect of handling of interrupting the CPU and therefore no pulses can be output or a continuous pulse is generated and consequently flicker cannot be reduced in some cases.

The above-described configuration can be included in various machines. For example, it can also be included in a machine such as a laminator or a warm air heater.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments maybe made without departing from the spirit and scope of the invention.

What is claimed is:

1. A heating apparatus comprising:
   a heat unit that generates heat in response to energization; and
   an energization unit that supplies AC power to the heat unit and energizes the heat unit discontinuously in a pulsatile manner at least when energization of the heat unit is started;
   wherein the energization unit turns on and off a control signal twice or more and sets an on and off period defined by a sum of an on time and an off time of the control signal to a period not matching an integral multiple of a half the period of the AC power;
   wherein the energization unit is configured to energize the heat unit when a control signal is on and when a voltage value of an AC power crosses zero and to stop energizing the heat unit when the control signal is off and when the voltage value of the AC power crosses zero;
   wherein the energization unit sets the on time of the control signal to a time not matching the time of an integral multiple of a half the period of the AC power supply; and
   wherein the energization unit sets the off time of the control signal to a time one to six times the time of a half the period of the AC power supply.

2. The heating apparatus as claimed in claim 1,
   wherein the energization unit sets the on time of the control signal to a time shorter than the time of a half the period of the AC power supply.

3. The heating apparatus as claimed in claim 1,
   wherein the energization unit sets the off time of the control signal to a time not matching the time of an integral multiple of a half the period of the AC power supply.

4. The heating apparatus as claimed in claim 1,
   wherein the energization unit prolongs the on time of the control signal with the passage of time from the energization start time.

5. The heating apparatus as claimed in claim 1, further comprising a CPU turning on and off the control signal.

6. The heating apparatus as claimed in claim 1, comprising:
   an integrated control unit;
   wherein the heat unit includes a plurality of heat units each provided with the energization unit;
   the energization unit includes a plurality of energization units; and
   the integrated control unit controls the plurality of energization units so that discontinuing the on state results in the control signals generated by the plurality of energization units being superposed in a pulsitile current.

7. The heating apparatus as claimed in claim 6,
   wherein the integrated control unit matches periods and phases of the control signals generated by the plurality of energization units so that discontinuing the on state results in the control signals being superposed in a pulsitile current.

8. The heating apparatus as claimed in claim 6,
   wherein the integrated control unit further controls the plurality of energization units so as to turn on and off the control signals in order.

9. The heating apparatus as claimed in claim 8,
   wherein the integrated control unit controls the plurality of energization units so as to turn on and off either one of control signals twice or more and afterwards turn on and off either one of the other control signals twice or more.

10. The heating apparatus as claimed in claim 8,
    wherein the integrated control unit controls the plurality of energization units so as to turn on and off, during a time from off timing of either one of control signals to on timing of the control signal, each one of the other control signals once.

11. A heating apparatus comprising:
a heat unit that generates heat in response to energization; and
an energization unit that supplies AC power to the heat unit and energizes the heat unit discontinuously in a pulsatile manner at least when energization of the heat unit is started;
wherein the energization unit turns on and off a control signal and detects a voltage value of the AC power crossing zero and switches on and off the control signal based on the detection result;
wherein the energization control unit is configured to energize the heat unit when a control signal is on and when a voltage value of an AC power crosses zero and to stop energizing the heat unit when the control signal is off and when the voltage value of the AC power crosses zero; and
wherein the energization unit counts the number of times the zero crossing detection unit has detected the voltage value of the AC power supply crossing zero and determines whether to switch on/off the control signal on the basis of the counted number.

12. The heating apparatus as claimed in claim 11, wherein the energization unit increases the number of count times necessary to switch the control signal from on to off according to a time elapsed from the energization start time.

13. The heating apparatus as claimed in claim 11, further comprising a CPU turning on and off the control signal.

14. The heating apparatus as claimed in claim 11, comprising:
an integrated control unit;
wherein the heat unit includes a plurality of heat units each provided with the energization unit;
the energization unit includes a plurality of energization control signal generation units; and
the integrated control unit controls the plurality of energization units so that discontinuing the on state results in the control signals generated by the plurality of energization units being superposed in a pulsitile current.

15. The heating apparatus as claimed in claim 14, wherein the integrated control unit matches periods and phases of the control signals generated by the plurality of energization units so that discontinuing the on state results in the control signals being superposed in a pulsitile current.

16. The heating apparatus as claimed in claim 14, wherein the integrated control unit further controls the plurality of energization units so as to turn on and off the control signals in order.

17. The heating apparatus as claimed in claim 16, wherein the integrated control unit controls the plurality of energization units so as to turn on and off either one of control signals twice or more and afterwards turn on and off either one of the other control signals twice or more.

18. The heating apparatus as claimed in claim 16, wherein the integrated control unit controls the plurality of energization units so as to turn and off, during a time from off timing of either one of control signals to on timing of the control signal, each one of the other control signals once.

19. An image formation apparatus, comprising:
a heat unit that generates heat in response to energization to heat a toner image formed on a recording medium for fixing the toner image on the recording medium; and
an energization unit that supplies AC power to the heat unit and energizes the heat unit discontinuously in a pulsatile manner at least when energization of the heat unit is started;
wherein the energization unit turns on and off a control signal twice or more and sets an on and off period defined by a sum of an on time and an off time of the control signal to a period not matching an integral multiple of a half the period of the AC power;
wherein the energization unit is configured to energize the heat unit when a control signal is on and when a voltage value of an AC power crosses zero and to stop energizing the heat unit when the control signal is off and when the voltage value of the AC power crosses zero;
wherein the energization unit sets the on time of the control signal to a time not matching the time of an integral multiple of a half the period of the AC power supply; and
wherein the energization unit sets the off time of the control signal to a time one to six times the time of a half the period of the AC power supply.

20. An image formation apparatus, comprising:
a heat unit that generates heat in response to energization to heat a toner image formed on a recording medium for fixing the toner image on the recording medium; and
an energization unit that supplies AC power to the heat unit and energizes the heat unit discontinuously in a pulsatile manner at least when energization of the heat unit is started;
wherein the energization unit turns on and off a control signal and detects a voltage value of the AC power crossing zero and switches on and off the control signal based on the detection result;
wherein an energization control unit configured to energize the heat unit when a control signal is on and when a voltage value of an AC power crosses zero and to stop energizing the heat unit when the control signal is off and when the voltage value of the AC power crosses zero; and
wherein the energization unit counts the number of times the zero crossing detection unit has detected the voltage value of the AC power supply crossing zero and determines whether to switch on/off the control signal on the basis of the counted number.

21. A heating apparatus comprising:
a heat unit that generates heat in response to energization; and
an energization unit that supplies AC power to the heat unit and energizes the heat unit discontinuously in a pulsatile manner at least when energization of the heat unit is started;
wherein the energization unit turns on and off a control signal twice or more and sets an on and off period defined by a sum of an on time and an off time of the control signal to a period not matching an integral multiple of a half the period of the AC power;
wherein the energization unit is configured to energize the heat unit when a control signal is on and when a voltage value of an AC power crosses zero and to stop energizing the heat unit when the control signal is off and when the voltage value of the AC power crosses zero;
wherein a sum of an on time and an off time of the control signal is longer than a half the period of the AC; and
wherein the energization unit sets the off time of the control signal to a time one to six times the time of a half the period of the AC power supply.

22. An image formation apparatus, comprising:
a heat unit that generates heat in response to energization to heat a toner image formed on a recording medium for fixing the toner image on the recording medium; and
an energization unit that supplies AC power to the heat unit and energizes the heat unit discontinuously in a pulsatile manner at least when energization of the heat unit is started;
wherein the energization unit turns on and off a control signal twice or more and sets an on and off period defined by a sum of an on time and an off time of the control signal to a period not matching an integral multiple of a half the period of the AC power;
wherein the energization unit is configured to energize the heat unit when a control signal is on and when a voltage value of an AC power crosses zero and to stop energizing the heat unit when the control signal is off and when the voltage value of the AC power crosses zero;
wherein a sum of an on time and an off time of the control signal is longer than a half the period of the AC power; and
wherein the energization unit sets the off time of the control signal to a time one to six times the time of a half the period of the AC power supply.

* * * * *